United States Patent [19]

Bertz et al.

[11] Patent Number: 4,769,917
[45] Date of Patent: Sep. 13, 1988

[54] METHOD AND APPARATUS FOR ORIENTING A FEELER OF A GEAR TESTING APPARATUS

[75] Inventors: Hans-Ulrich Bertz, Rastatt; Thomas Karg, Karlsruhe; Willy Hofler, Erich-Heckel-Strasse 22, D-7500 Karlsruhe 41, all of Fed. Rep. of Germany

[73] Assignee: Willy Hofler, Karlsruhe, Fed. Rep. of Germany

[21] Appl. No.: 49,379

[22] Filed: May 14, 1987

[30] Foreign Application Priority Data

May 14, 1986 [DE] Fed. Rep. of Germany ....... 3616177

[51] Int. Cl.$^4$ ............................................. G01M 13/02
[52] U.S. Cl. .................................. 33/179.5 R; 33/520; 33/DIG. 1
[58] Field of Search ................... 33/179.5 R, 179.5 E, 33/DIG. 1, 504, 520

[56] References Cited

U.S. PATENT DOCUMENTS

| | | | |
|---|---|---|---|
| 4,128,945 | 12/1978 | Barritt | 33/DIG. 1 |
| 4,319,400 | 3/1982 | Chung | 33/DIG. 1 |
| 4,356,556 | 10/1982 | Sterki | 33/179.5 R |
| 4,532,715 | 8/1985 | Sterki | 33/179.5 R |
| 4,646,566 | 3/1987 | Hofler | 33/179.5 R |

FOREIGN PATENT DOCUMENTS 2952497 2/1981 Fed. Rep. of Germany .
3125693 1/1983 Fed. Rep. of Germany .
3320983 12/1984 Fed. Rep. of Germany .

Primary Examiner—William D. Martin, Jr.
Attorney, Agent, or Firm—Edwin E. Greigg

[57] ABSTRACT

A method for orienting a feeler of an apparatus for testing gear flank profiles and flank lines of gear wheels is disclosed, in which the feeler is successively inserted, in two adjacent positions, into an accurately made gap element located on the gear wheel and from the thus ascertained values the location of the point of intersection of the wheel axis with the measuring plane is ascertained, optionally by means of a computer. The gap element, embodied as an orientation gap mounted on the gear wheel, that is approached by the feeler in the first position is rotated with the gear wheel into a second position, and there the feeler, embodied solely by the measuring feeler, is inserted into the same orientation gap. Therefore measurements are made by use of the same orientation gap and the same feeler at two different locations.

4 Claims, 2 Drawing Sheets

METHOD AND APPARATUS FOR ORIENTING A FEELER OF A GEAR TESTING APPARATUS

BACKGROUND OF THE INVENTION

The present invention relates to a method and apparatus for orienting a feeler of an apparatus for testing the tooth flank profile and the flank lines (pitch of the helix) of gear wheels with respect to their axis of rotation, wherein the feeler is movable at a tangent to the gear wheel (X direction) as well as at right angles thereto (Y direction) along incremental travel transducers. The feeler is inserted in succession, at two adjacent positions, into a gap element located on the gear wheel until the feeler head contacts both sides of the gap flanks, and from the X and Y values thus ascertained at the travel transducers, with the aid of the pivot angle defined by the two positions, the location of the point of intersection of the wheel axis with the measuring plane is ascertained.

This method is known from German Pat. No. 33 20 983, where it is explained in detail in conjunction with FIG. 10. According to this description, as a substitute for the theretofore necessary orientation of the center point with the aid of a calibration device placed at the center of rotation of the gear wheel, or with the aid of an alignment device, an orientation feeler is used the head of which is a ball manufactured with high precision adapted to the modulus of the particular gear wheel to be tested. The center point orientation of the testing apparatus is performed in that the orientation feeler is moved in succession into two adjacent tooth gaps, and from the values measured in the X and Y direction in combination with the pivot angle between the two tooth gaps approached, the coordinates for the point on the wheel axis that is located in the corresponding measuring plane are ascertained by means of a calculator connected to the testing apparatus.

A disadvantage of the known type of method is that different tooth gaps are used for the orientation of the testing apparatus, and these tooth gaps likewise have a different, variable amount of error originating in the gear wheel manufacture, so that these tooth gap errors of unknown magnitude become part of the orientation process and in a correspondingly unforeseeable manner lead to an incorrect location of the wheel axes, even though an exact pitch angle is used, which is an integral multiple of the pitch angle of the gear wheel and is known from the geometry of the gear wheel to be tested.

A further disadvantage is that for the orientation process, orientation feelers must be used that have feeler heads that are adapted to the modulus of the gear wheel to be tested in such a way that the feeler head, upon insertion into the particular tooth gap comes into contact in the vicinity of the pitch circle with the flanks adjoining the tooth gap. These orientation feelers are expensive to manufacture and must be kept in inventory in correspondingly great numbers. For gear wheels having large moduli, these feelers also have considerable weight, and the moving parts of the testing apparatus, in particular, as well as the means for guiding the feelers must be designed taking this weight into consideration; overall a considerably larger and more expensive testing apparatus is required. Even then, because of their weight, the orientation feelers for large moduli have an especially major effect on the accuracy of the test results, since for the testing process they have to be replaced with a measuring feeler the weight of which may be insignificant in comparison with their own weight.

A further problem arises because it is only with extreme difficulty that the testing apparatus stand, with its approximately 1.5-meter-long guide track representing the Z direction or the Z axis, can be aligned exactly parallel to the axis of the gear wheel to be tested. Any deviation from this parallelism dictates an incorrect movement of the measuring feeler along the tooth flank profile and along the flank lines. This falsifies the gear wheel testing result, which given the accuracy presently attained in gear technology is on the order of magnitude of the measuring accuracy of the test equipment and therefore cannot be ignored.

All the above-described problems arise particularly in connection with portable test equipment, which on the one hand is intended to be lightweight and small so that it is readily portable, but on the other hand should not be inferior in its accuracy to a stationary measuring machine; yet it is highly desirable to avoid using stationary measuring equipment, so that the gear wheel that is to be tested will not need to be rechucked repeatedly, for instance during manufacture.

OBJECT AND SUMMARY OF THE INVENTION

It is accordingly an object of the invention to improve the above-described generic method so that tooth gap deviations can no longer affect the accuracy of the testing apparatus orientation process in terms of the axis of rotation of the gear wheel to be tested. At the same time, the method is to be embodied such that the initial usage of orientation feelers prior to their being replaced with measuring sensors becomes unnecesary. Finally, proceeding along the same lines, a possibility is to be disclosed with the aid of which deviations in parallelism between the axis of rotation of the gear wheel to be tested on the one hand and the test apparatus guide track in the Z direction on the other can be ascertained easily and accurately both for the movement of the measuring feeler and/or for taking into account the values measured by this measuring feeler. In summary, not only should the testing accuracy be increased, but the testing work and the equipment required for performing it should be made simpler and less expensive.

According to the invention, and with the above-described generic method as a point of departure, this object is attained in that for an orientation feeler, the measuring feeler is used, and for the tooth gap, an accurately produced orientation gap element is used that is releasably placed against the gear wheel to be tested in the vicinity of a teeth, with its opening oriented substantially radially outward; the orientation gap approached by the measuring feeler at the first position is pivoted by rotation of the gear wheel into the second position, where the measuring feeler is introduced into this same orientation gap; and that from the X and Y values of the two positions, which include the pivot angle, the location of the center of rotation of the wheel is calculated.

While the orientation and testing operations in the known art are basically performed on a stationary gear wheel, in the present method the gear wheel is rotated about a certain angle, in order to put the feeler into contact with the same gap in both positions. As a consequence, any gap error that may be present, or error in the positioning of the emplaced orientation gap, arises to the same extent in both positions used in the orientation process, and hence is eliminated as a factor in the accuracy of the orientation process.

Since, according to the invention, the measuring feeler is used as the previously used orientation feeler, and an orientation gap element releasably mounted on the gear wheel to be tested which corresponds to the head of the measuring feeler is used as the gap element, the orientation feelers that were previously required in great numbers and were expensive as well as being unfavorable because of their sometimes considerable weight can now be dispensed with. The ensuing replacement of the known prior art orientation feelers with the measuring feelers to be used for the remaining measuring operations also becomes unnecessary. As a result, the testing apparatus can be made smaller and lighter in weight. The costs that the orientation feelers entailed are dispensed with, as is the work necessary for making the change from the orientation feelers to the measuring feelers, as well as the uncertainties this involved in terms of accuracy. Finally, the influence of a manufacturing error between the orientation feeler and the measuring feeler is also precluded. All of this is made possible because only a single, simple component part, in the form of the orientation gap, is needed and the measuring feeler can have the same shape for all the work to be done. This orientation gap can be readily mounted on any gear wheel without particular effort, for example by being clamped magnetically to it, and there are no particular requirements in terms of the positioning of the orientation gap, because as already noted above, an "error" arises to the same extent in both positions approached by the measuring feeler and as a consequence is eliminated.

By this means, the orientation of the testing apparatus is reduced to a simple, quickly performed operation, which has become much more accurate than the comparable operation in the prior art.

In connection with the orientation process it is suitable for the adjustment of the pivot angle about which the gear wheel is rotated from the first position to the second position, in the orientation of the gap used for the orientation process, to be effected by means of the indexing attachment of the gear cutting or gear wheel testing machine. This indexing attachment, which is present in any case, is manufactured extremely accurately in modern machines and consequently does not have any error of major import.

However, instead of being performed by the indexing attachment, the pivot angle adjustment can also be performed by an angle encoder rotationally connected to the gear wheel to be tested, such as an incremental angle encoder. Such devices likewise enable extremely accurate setting of the pivot angle. Naturally, other angle measuring systems and indexing attachments may also be used.

The subject of the invention summarized above also affords an opportunity of further increasing the accuracy or further simplification in terms of alignment of the testing apparatus, in particular for transportable testing apparatuses in terms of the adjustability of the feeler at right angles to the X and Y direction (i.e. in the Z direction), for example along a testing apparatus stand. This is attained by mounting the orientation gap element on both sides of the gear wheel to be tested and for these two orientation planes determining the location of the centers of rotation of the gear wheel, and from a deviation in the values on both sides for the center of rotation determining the directional deviation between the wheel axis and the Z direction as a function of the distance of the values in the Z direction; this directional deviation is used as a correction value for the motion of the measuring feeler and/or for the values measured by this measuring feeler in testing the profile or profile lines of the gear flanks.

By proceeding in this way, according to the invention, a directional deviation between the wheel axis and the Z direction of the testing apparatus stand, and hence of the testing apparatus, can be ascertained extremely accurately, with the aid of the same orientation gap or a second orientation gap for the other side of the wheel. Any error can be taken into account with the aid of the computer connected to the testing apparatus so that the measuring feeler performing the testing work undergooes a correction in the travel route it follows, or that the values picked up by the measuring feeler in the testing work are recalculated for a corresponding correction factor, so that the testing apparatus can remain uncorrected in terms of the directional deviation of its Z axis, where the considerable expenditure of time and effort is saved.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
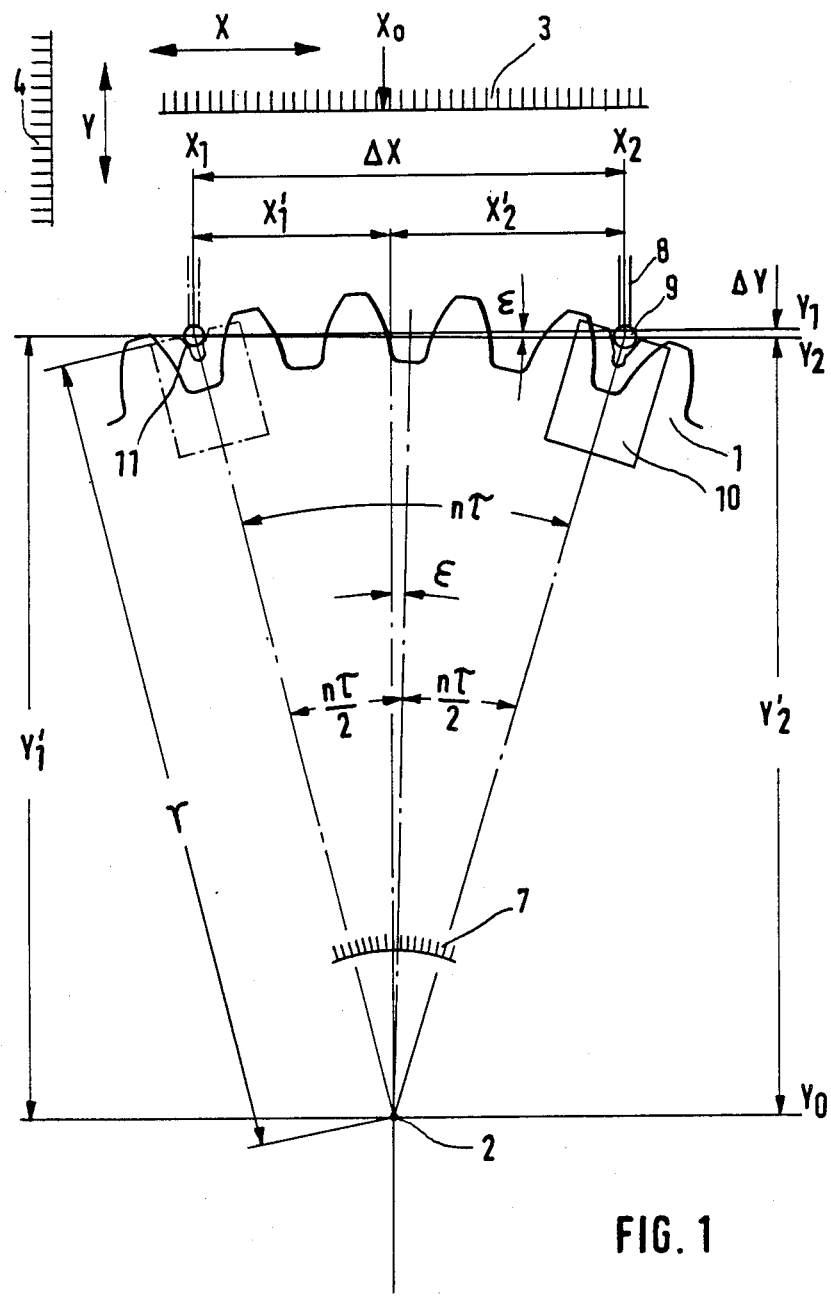
FIG. 1 is a simplified, fragmentary top view of a gear wheel, with orientation performed with the aid of a measuring feeler and an orientation gap.

FIG. 1 shows part of a gear wheel 1 in plan view, which is rotatable about its center point 2 on a gear cutting machine or measuring machine. Disposed facing the teeth of the gear wheel is a testing apparatus, not shown in detail and of which only the incremental travel transducers are represented at 3 at a tangent to the gear wheel and at 4 at right angles to the tangent line. A measuring feeler 8 including the head 9 which is very small and is embodied without taking into account the modulus of the gear wheel to be tested is used. The testing apparatus is movable in a known manner by means of carriages, not shown. The travel transducers 3 and 4 enable picking up the X and Y values of the position in which the feeler 8 is located at that time. These picked-up coordinate values are supplied to the computer connected to the testing apparatus which record the picked-up valves.

A gap component 10 is mounted on the gear wheel 1 in a releasable manner, for instance by magnetic adherence, and has a universally embodied orientation gap 11 aligned radially outward with respect to the gear wheel. This gap has a prismatic cross section, with highly accurately ground and polished flanks. The orientation gap 11 of the component 10 need not necessarily be located above a tooth gap as shown in FIG. 1, or below a tooth gap.

For orientation of the testing apparatus with respect to the gear wheel 1, the feeler head 9 of the measuring feeler 8 is inserted into the orientation gap 11 of the component 10 such that the feeler head 9 rests on both flanks of the orientation gap 11. After the measured values of this position have been picked up and after the retraction of the feeler from the orientation gap, the gear wheel is pivoted further by the angle $n\tau$, which may be measured by the incremental angle encoder 7. Now the operation of insertion of the measuring feeler 8 into the gap 11 is repeated for the new position of the component 10. The resultant orientation positions are represented in FIG. 1 with subscripts 1 and 2. The travel distance $\Delta X$ from $X_1$ to $X_2$ and $\Delta Y$ from $Y_1$ to $Y_2$ are the travel routes of the carriages of the apparatus. From these travel distances and from the pivot angle of the gear wheel, the coordinates for the point of the wheel axis that is located in the corresponding measuring plane can be calculated.

For the sake of completeness, it should be noted as well that the variable $\tau$ represents the pitch angle of the particular gear wheel being tested. Its magnitude need not be taken into account, however, so that for the pivot angle $n\tau$, any arbitrary angle is possible; its selection, however, will be in accordance with the optimal adjustment capabilities of the indexing worm gear or of the incremental angle encoder 7.

The orientation of the testing apparatus can now be performed, by determination of the coordinates $X_0$ and $Y_0$, in that the measuring feeler 8 is inserted into the orientation gap element at two pivot positions, marked with subscripts 1 and 2, of the gear wheel. From the thus ascertained variables $\Delta X$ and $\Delta Y$ in combination with the pivot angle $n\tau$, the coordinate values for $X_0$ and $Y_0$ are obtained as follows:

$$\epsilon = \arctan \frac{\Delta Y}{\Delta X}$$

$$L^2 = \Delta X^2 + \Delta Y^2$$

$$r = \frac{L}{2\SIN \frac{n\tau}{2}}$$

$$r = \frac{\sqrt{\Delta X^2 + \Delta Y^2}}{2\SIN \frac{n\tau}{2}}$$

$$X_{1,2}' = \frac{\sqrt{(\Delta X^2 + \Delta Y^2)} \cdot \SIN\left(\pm \frac{n\tau}{2} \pm \epsilon\right)}{2\SIN \frac{n\tau}{2}}$$

$$X_0 = X_{1,2} - X_{1,2}'$$

$$Y^1 = \sqrt{r^2 - X_{1,2}'^2}$$

$$Y_0 = Y_{1,2} + Y_{1,2}^1$$

L is the distance the center point of the measuring feeler head 9 travels between the two positions 1 and 2. For the sake of simplicity, this variable is not shown in FIG. 1. The variable r is the radius of the circle described by the center point of the measuring feeler head 9 about the point 2. In terms of the angle function, $$\SIN\left(\pm \frac{n\tau}{2} \pm \epsilon\right)$$

it is taken into account that the two gap positions used for the orientation can be located either on both sides, or on only one side, of the value $X_0$. Here, the following relationships, which can be taken into account by the computer connected to the testing apparatus, substantially apply:

In terms of $X_0$, on one side  on both sides $$\SIN\left(\epsilon \pm \frac{n\tau}{2}\right) \quad \SIN\left(\frac{n\tau}{2} \pm \epsilon\right)$$

is decided at $$\epsilon - \frac{n\tau}{2} > 0 \; \epsilon - \frac{n\tau}{2} < 0$$

Once the values $X_0$ and $Y_0$ are calculated in the manner described, a point on the wheel axis (in FIG. 1, point 2) is accurately ascertained. If the same orientation process is repeated in a second measuring plane, for instance at the second end face of the gear wheel—after the component part having the orientation gap is attached to this end face—a further point on the wheel axis is obtained.

Figure 2:
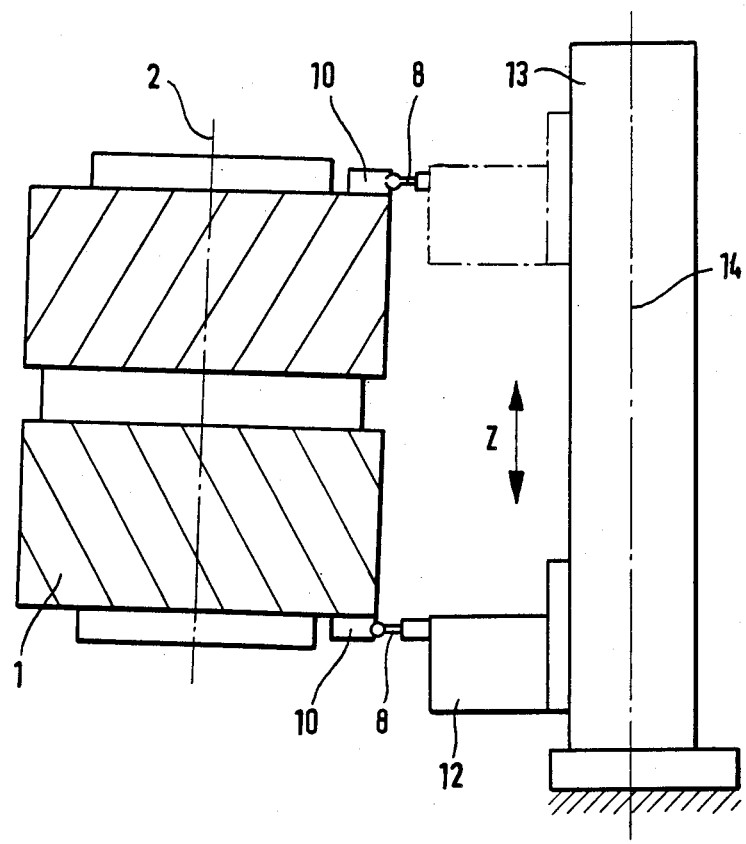
FIG. 2 is a simplified side view of a testing apparatus with a Z direction deviating from parallelism with the wheel axis.

To this end, FIG. 2 shows a gear wheel 1, not shown in further detail and clamped to a gear cutting machine, for example, the axis 2 of which has a certain location or orientation. Facing the wheel 1 is a testing apparatus 12, which is displaceable along an apparatus stand 13 in the Z direction, at right angles to the X and Y coordinate axis shown in FIG. 1. As the drawing shows, this Z direction 14 is not parallel to the orientation of the axis 2, which can easily happen, for instance, when setting up transportable equipment. Because of this deviation in the direction of the axis 2 on the one hand and the Z direction 14 on the other, the measuring feeler 8 would now not move, in this testing movement, exactly along the prescribed curve with respect to the gear wheel 1, depending on whether the tooth profile or the flank line is to be tested.

To preclude the resultant falsification in the values ascertained in wheel testing from having any influence, a separate component 10 and 10' having an orientation gap can now be disposed in the manner shown on both the top and bottom of the gear wheel 1, and for both sides of the wheel, the determination of the respective center points of the wheel sections located in the measuring planes can be performed; with the aid of the travel route Z between the upper and lower position of the testing apparatus 12, the tilt angle between the wheel axis 2 and the Z axis 14 can be calculated. Taking this tilt angle into account, the measuring feeler 8, in its movement associated with the testing process, can now have imposed on it a correction that takes this tilt angle into account. Another possibility is for the measured values ascertained by the measuring feeler 8 in the testing movement to be corrected taking the tilt angle into account.

In this way, it is no longer necessary for instance for the stand 13 of the testing appartus to be initially aligned precisely accurately parallel to the axis of the wheel to be tested, where even this kind of alignment process would still involve a residual error. Instead, the included tilt angle can be ascertained in the above manner and taken into account with an accuracy that is within the accuracy of the testing apparatus 12.

Since the orientation gap element is attached to the wheel the measuring device and orientation gap element may be used initially to align the wheel for cutting the teeth.

The foregoing relates to a preferred exemplary embodiment of the invention, it being understood that other variants thereof are possible within the spirit and scope of the invention, the latter being defined by the appended claims.

What is claimed and desired to be secured by Letters Patent of the United States is:

1. A method for orienting a feeler of an apparatus having a head for testing the tooth flank profile and the flank lines (pitch of the helix) of gear wheels with respect to their axis of rotation, which comprises moving the feeler at a tangent to the gear wheel (X direction) as well as at right angles thereto (Y direction) along incremental travel transducers, positioning an orientation gap element having tooth flanks onto the gear wheel at a first position, moving the feeler into a gap in the gap element located on the gear wheel at the first position until the feeler head contacts both sides of the gap flanks, recording the X and Y values thus ascertained at the travel transducers, backing the feeler out from the gap flanks, rotating the wheel to a second position with said orientation gap element in place, stopping said wheel rotation after an angular rotation, moving said feeler along a tangent line with respect to said wheel opposite said second position, moving the feeler into the gap of the orientation gap element to contact both flanks, recording the X and Y values thus obtained, determining the pivot angle defined by said first and second positions and with the aid of the pivot angle defined by the first and second positions, ascertaining the location of the point of intersection of the wheel axis with the measuring plane, and calculating the location of the center point of rotation of the wheel from the X and Y values of the two positions, which include the pivot angle.

2. A method as defined by claim 1 with a feeler adjustable at right angles (in the Z direction) to the X and Y direction along an incremental travel transducer, mounting the orientation gap on opposite sides of the gear wheel to be tested, and determining the location of the center points of rotation of the gear wheel for these two orientation planes on opposite sides of the wheel, determining a deviation of the values for the center point of rotation on both sides of the wheel, as a function of their distance in the Z direction, ascertaining the directional deviation between the wheel axis and the Z direction as a correction variable for the movement of the measuring feeler and for the values measured by said measuring feeler in testing the profile of the gear flanks.

3. An apparatus for determining a center point of rotation of a gear wheel, comprising a toothed gear wheel, an orientation element provided with gap means having gap flanks, said orientation element being releasably secured on one side of the gear wheel and disposed adjacent at least one gear tooth with said gap flanks opening radially outward, said gap means adapted to receive a measuring feeler disposed for movement at a tangent to the gear wheel and at right angles thereto, said movements being recordable via incremental travel transducers.

4. An apparatus as set forth in claim 3, wherein said orientation element is magnetically secured to said gear wheel.

* * * * *